(12) United States Patent
Urdampilleta González et al.

(10) Patent No.: US 12,738,539 B2
(45) Date of Patent: Sep. 15, 2026

(54) ELECTROLYTE HYDROGEL AND ITS USE IN AN ELECTROCHEMICAL CELL

(71) Applicant: VARTA Microbattery GmbH, Ellwangen Jagst (DE)

(72) Inventors: Idoia Urdampilleta González, Donostia-San Sebastián (ES); Martin Krebs, Rosenberg (DE); Iñaki Gómez Agúndez, Lasarte-Oria (ES); Luis Cesar Colmenares Rausseo, Donostia-San Sebastián (ES); Jose Alberto Blázquez Martín, Pasai Antxo (ES)

(73) Assignee: VARTA Microbattery GmbH, Ellwangen Jagst (DE)

( * ) Notice: Subject to any disclaimer, the term of this patent is extended or adjusted under 35 U.S.C. 154(b) by 433 days.

(21) Appl. No.: 18/570,587

(22) PCT Filed: Jun. 3, 2022

(86) PCT No.: PCT/EP2022/065155
§ 371 (c)(1),
(2) Date: Dec. 14, 2023

(87) PCT Pub. No.: WO2022/263206
PCT Pub. Date: Dec. 22, 2022

(65) Prior Publication Data

US 2024/0291031 A1 Aug. 29, 2024

(30) Foreign Application Priority Data

Jun. 16, 2021 (EP) .................................... 21179913

(51) Int. Cl.
*H01M 10/0565* (2010.01)
*H01M 4/04* (2006.01)
(Continued)

(52) U.S. Cl.
CPC ..... *H01M 10/0565* (2013.01); *H01M 4/0414* (2013.01); *H01M 4/42* (2013.01);
(Continued)

(58) Field of Classification Search
CPC ............. H01M 10/0565; H01M 10/36; H01M 10/365; H01M 10/38
See application file for complete search history.

(56) References Cited

U.S. PATENT DOCUMENTS

| | | | |
|---|---|---|---|
| 4,119,770 | A | 10/1978 | Land |
| 7,348,096 | B2 | 3/2008 | Schubert et al. |
| 2010/0081049 | A1 | 4/2010 | Holl et al. |

(Continued)

FOREIGN PATENT DOCUMENTS

| | | | |
|---|---|---|---|
| CN | 103636040 | A | 3/2014 |
| CN | 112310490 | A | 2/2021 |

(Continued)

OTHER PUBLICATIONS

International Search Report dated Oct. 17, 2022, of counterpart International Application No. PCT/EP2022/065155.

(Continued)

*Primary Examiner* — Kevin E Yoon
(74) *Attorney, Agent, or Firm* — DLA Piper LLP (US)

(57) ABSTRACT

An electrolyte hydrogel for an electrochemical cell includes a self standing polymer network with a crosslinked, non-ionic polymer and a cationic polymer and a salt in an aqueous solvent and/or dispersant.

15 Claims, 3 Drawing Sheets

(51) Int. Cl.

| | |
|---|---|
| ***H01M 4/42*** | (2006.01) |
| ***H01M 4/48*** | (2010.01) |
| ***H01M 4/62*** | (2006.01) |
| ***H01M 10/36*** | (2010.01) |
| *H01M 4/02* | (2006.01) |

(52) U.S. Cl.

CPC .......... *H01M 4/483* (2013.01); *H01M 4/622* (2013.01); *H01M 10/36* (2013.01); *H01M 10/365* (2013.01); *H01M 2004/027* (2013.01); *H01M 2004/028* (2013.01); *H01M 2300/0082* (2013.01); *H01M 2300/0085* (2013.01)

(56) References Cited

U.S. PATENT DOCUMENTS

| | | | | |
|---|---|---|---|---|
| 2010/0104947 | A1* | 4/2010 | Choi ................ | H01M 10/0565 429/188 |
| 2014/0160549 | A1 | 6/2014 | Sandberg et al. | |
| 2016/0049690 | A1 | 2/2016 | Basak et al. | |
| 2019/0140315 | A1 | 5/2019 | Zhi et al. | |

FOREIGN PATENT DOCUMENTS

| | | | |
|---|---|---|---|
| CN | 112898596 | A | 6/2021 |
| JP | H02195652 | A | 8/1990 |
| JP | 2001-335706 | A | 12/2001 |
| JP | 2005220271 | A | 8/2005 |
| JP | 2005322635 | A | 11/2005 |
| WO | 03/069700 | A2 | 8/2003 |
| WO | 2006/105966 | A1 | 10/2006 |

OTHER PUBLICATIONS

Lu, Q. et al., “Advanced semi-interpenetrating polymer network gel electrolyte for rechargeable lithium batteries,” *Electrochimica Acta*, 2015, No. 152, pp. 489-495.

Office Action dated Mar. 9, 2026, from counterpart Japanese Application No. 2023-57731.

Office Action dated Apr. 1, 2026, from counterpart Chinese Application No. 202280041915.X.

* cited by examiner 101
100
102
13
104
103
UV
13
10
14
100

ELECTROLYTE HYDROGEL AND ITS USE IN AN ELECTROCHEMICAL CELL

TECHNICAL FIELD

This disclosure relates to an electrolyte hydrogel, a process for preparation of the electrolyte hydrogel, an electrochemical cell and a process for the manufacturing of an electrochemical cell, wherein the electrochemical cell comprises the electrolyte hydrogel as an ion-conductive electrolyte.

BACKGROUND

The function of electrochemical cells is the storage of energy. They comprise a positive and a negative electrode separated from one another by a separator. In energy storage cells of this type, an electrochemical and energy-releasing reaction occurs, which is constituted of two electrically interconnected, but mutually spatially separated partial reactions. A partial reaction, which occurs at a comparatively low redox potential, proceeds at the negative electrode. The other partial reaction proceeds at the positive electrode, at a comparatively high redox potential. During discharging, electrons are released at the negative electrode by an oxidation process, resulting in an electron stream which flows via an external load to the positive electrode, where a corresponding quantity of electrons are taken up. A reduction process thus occurs at the positive electrode. At the same time, for the purposes of charge equalization, an ion stream corresponding to the electrode reaction is present within the cell. This ion stream passes through the separator, usually mediated by an ion-conducting electrolyte.

In secondary electrochemical cells, this discharge reaction is reversible, i.e. it is possible to reverse the conversion of chemical energy into electrical energy during discharge. In primary cells, on the other hand, the discharge reaction is irreversible or recharging of the cell is prohibited for other reasons.

Electrochemical cells cannot only be produced by assembling premanufactured individual components. In recent years, the production of individual functional parts of the cells, in particular of the electrodes and/or the separator and/or conductor paths, by printing, i.e. from a paste containing a solvent and/or dispersant agent, has also gained importance.

Oftentimes, printed electrochemical cells have a multilayer structure. In conventional design, a printed electrochemical cell usually comprises two current collector layers, two electrode layers and one electrolyte/separator layer in a stacked arrangement. The electrolyte layer is located between the two electrode layers, while the current collectors form the top and bottom of the electrochemical cell. An electrochemical cell with such a structure is described in U.S. Pat. No. 4,119,770 A, for example.

Significantly flatter are electrochemical cells, in which electrodes are located next to each other on an electrically non-conductive substrate (coplanar arrangement). Such cells are described in WO 2006/105966 A1, for example. The electrodes are connected to each other via a layer of an ion-conductive electrolyte, which may be a gelled zinc chloride paste, for example. The electrolyte may be reinforced and stabilized by a fleece- or net-like material.

US 2010/0081049 A1 discloses a method of producing a planar cell, wherein electrodes are applied to a flexible support using printable pastes. An electrolyte can be applied in the form of a gel. To prepare the electrolyte, a gel-like paste with zinc chloride as a conductive salt and hydroxyethyl cellulose as thickener is used.

Other approaches use sodium carboxymethyl cellulose (Na-CMC) as a thickening agent for a gelled electrolyte.

"Advanced semi-interpenetrating polymer network gel electrolyte for rechargeable lithium batteries" (Lu et al., Electrochimica Acta 152 (2015) 489-495) describes a gel polymer electrolyte for lithium-ion-cells based on polyethylen glycol diacrylate (PEGDA)-co-PVC network with a linear PVDF-HFP polymer (polyvinylidene fluoride-co-hexafluoropropylene).

US 2016/0049690 A1 discloses high-ionic conductivity electrolyte compositions of semi-interpenetrating polymer networks in the field of lithium-ion technology.

WO 03/069700 A2 discloses a thin, flexible carbon zinc cell with at least one printed electrode. A gelled electrolyte is described in connection with this cell. To produce the gelled electrolyte, the addition of non-ionic or anionic derivatives of natural guar gum to an aqueous zinc chloride solution is proposed. The preferred additive is Galactasol A4. As a further possibility for the production of a gelled electrolyte, it is proposed to dissolve a polymer based on low molecular weight polyethylene glycol (PEG), preferably polyethylene glycol diacrylate (PEGDA), in a zinc chloride solution and crosslink it by UV exposure. A photoinitiator and polyethylene oxide as thickener and Triton (surfactant) may be added. Polyethylene oxide is a synonym for polyethylene glycol according to general understanding, whereby a polyethylene oxide with high molecular weight is used in the context of WO 03/069700 A2. As an alternative to polyethylene oxide and Triton, the use of fumed silica as a thickener is proposed.

Known gelled electrolytes are sometimes not easy to handle, in particular in connection with cells comprising zinc-based electrodes. Such cells usually require an electrolyte with divalent $Zn^{2+}$ ions, which often shows precipitations. During production of the gelled electrolytes, the zinc ions may interact with sodium carboxymethyl cellulose due to its anionic character, thereby causing agglomerations and precipitations. As a consequence, the concentration of zinc salts which may be added is limited and the formation of a gel, especially a hydrogel, is not possible or is only possible to a very limited extent.

It could therefore be helpful to provide an improved hydrogel electrolyte and a process for its preparation. On the one hand, the hydrogel needs to allow optimal ion conductivity and, on the other hand, the hydrogel needs to have the necessary mechanical properties and, in particular, sufficient mechanical stability. Preferably, it should be possible to integrate the hydrogel electrolyte into different types of electrochemical cells, e.g. into cells which are prepared at least partly by a printing process. The electrolyte hydrogel should permit high concentrations of electrolytically active substances, namely conductive salts. The corresponding ions should be able to move freely in the aqueous matrix, thereby resulting in improved ionic conductivity of the hydrogel electrolyte.

SUMMARY

We provide an electrolyte hydrogel for an electrochemical cell including a self standing polymer network with a crosslinked, non-ionic polymer and a cationic polymer and a salt in an aqueous solvent and/or dispersant.

We also provide a method of preparing an electrolyte hydrogel including:

a. providing a composition, wherein the composition includes
   i. a crosslinkable, non-ionic polymer,
   ii. a cationic polymer,
   iii. an aqueous solvent and/or dispersant, and
   iv. a salt which is solved in at least one of aqueous solvent and dispersant;
b. forming a layer of the composition on a support; and
c. treating the layer such that crosslinking of the non-ionic polymer occurs and thereby the electrolyte hydrogel is formed based on a self standing polymer network.

We further provide an electrochemical cell including:

a. the electrochemical cell includes at least one negative electrode and at least one positive electrode; and
b. the electrochemical cell includes an ion-conductive electrolyte which is the electrolyte hydrogel for an electrochemical cell including a self standing polymer network with a crosslinked, non-ionic polymer and a cationic polymer and a salt in an aqueous solvent and/or dispersant.

We also further provide a method of manufacturing the electrochemical cell including:

a. the electrochemical cell includes at least one negative electrode and at least one positive electrode; and
b. the electrochemical cell includes an ion-conductive electrolyte which is the electrolyte hydrogel for an electrochemical cell including a self standing polymer network with a crosslinked, non-ionic polymer and a cationic polymer and a salt in an aqueous solvent and/or dispersant; with at least one negative electrode and at least one positive electrode and an ion-conductive electrolyte which is an electrolyte hydrogel for an electrochemical cell including a self standing polymer network with a crosslinked, non-ionic polymer and a cationic polymer and a salt in an aqueous solvent and/or dispersant, wherein to prepare the hydrogel electrolyte a method of preparing an electrolyte hydrogel, including:
a. providing a composition, wherein the composition includes
   i. a crosslinkable, non-ionic polymer,
   ii. a cationic polymer,
   iii. an aqueous solvent and/or dispersant, and
   iv. a salt which is solved in at least one of aqueous solvent and dispersant;
b. forming a layer of the composition on a support; and
c. treating the layer such that crosslinking of the non-ionic polymer occurs and thereby the electrolyte hydrogel is formed based on a self standing polymer network;

is carried out.

DETAILED DESCRIPTION

Figure 1:
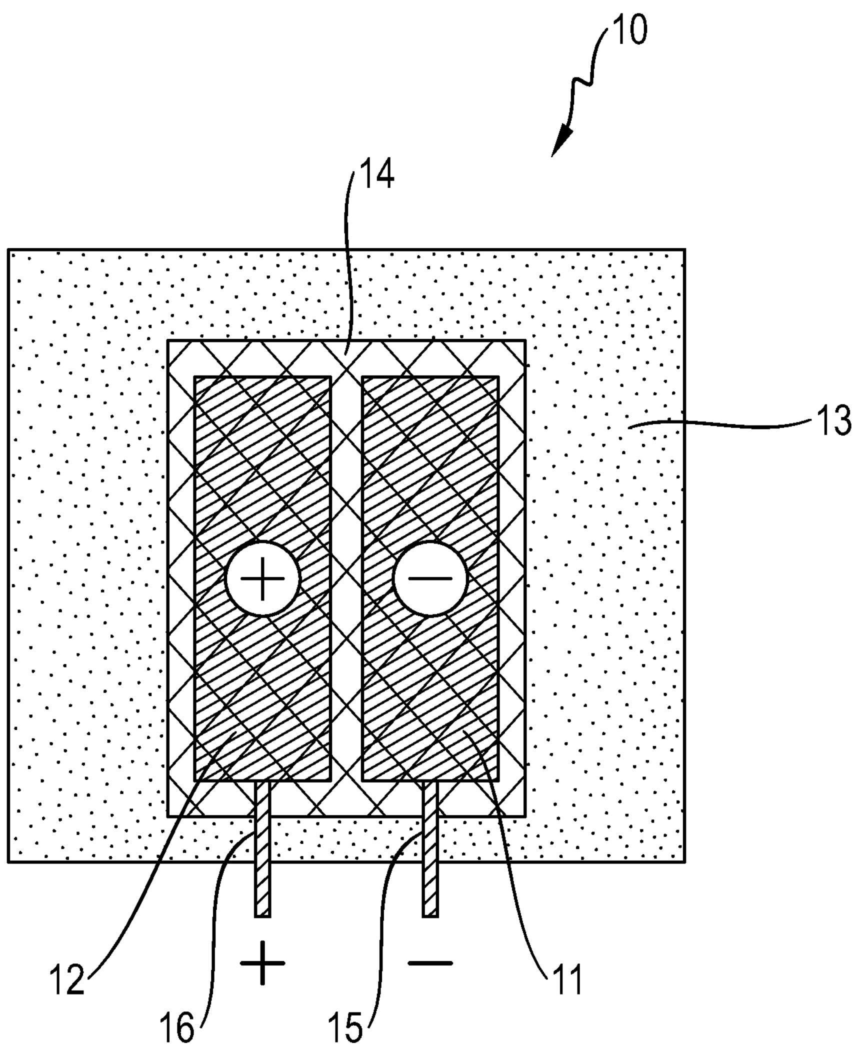
FIG. 1 is a schematic representation of the construction of an electrochemical cell with electrodes in a co-planar arrangement.

Our electrolyte hydrogel is primarily intended for use in an electrochemical cell. The electrolyte hydrogel is preferably based on a self standing polymer network with a crosslinked, non-ionic polymer and a cationic polymer and a salt in an aqueous solvent and/or dispersant. The following definitions apply:

A non-ionic polymer is a polymer that does not comprise anionic or cationic groups like carboxylate groups or ammonium groups. Usually, a non-ionic polymer is not charged at neutral pH.

A cationic polymer is a polymer that comprises cationic groups like ammonium groups. Usually, it is positively charged at neutral pH.

An aqueous solvent and/or dispersant contains water in an amount of at least 50 weight percent. Preferably, the aqueous solvent and/or dispersant is water. The expression "solvent and or dispersant" is used since the electrolyte hydrogel may contain components, for example, the salt, which are soluble in the aqueous solvent and/or dispersant, and other components, which are only dispersible in the aqueous solvent and/or dispersant.

"Crosslinked polymer" or "crosslinkable polymer" refers to a polymer containing crosslinked respectively crosslinkable functional groups. The crosslinking may occur, for example, via a cationic, an anionic or a free radical reaction. For a free radical reaction, the crosslinkable functional group may be, for example, an acrylate group.

"A salt" may also comprise a mixture of more than one salt of more than one type of salt.

A particular advantage of our electrolyte hydrogel is that, during formation of the electrolyte hydrogel, no agglomerations or precipitations in the electrolyte hydrogel occur. It is believed that this results from the the use of the cationic polymer, in addition to the crosslinkable, non-ionic polymer. In the hydrogel, the crosslinked non-ionic polymer forms a matrix in which the ionic polymer is embedded. Due to the cationic nature of the embedded polymer, a very stable and inert electrolyte hydrogel can be produced. This ensures a good mobility of the ions of the salt within the matrix, namely the electrolyte hydrogel, and therefore a good ionic conductivity of the electrolyte.

Moreover, we use high concentrations of the salt within the electrolyte hydrogel. Additionally, concentration gradients of the ions within the electrode matrix and in the interphase between the electrodes and the gel electrolyte respectively the electrolyte hydrogel during the electrochemical processes can be reduced or minimized, which further improves the properties of a resulting electrochemical cell in electrochemical terms.

The electrolyte hydrogel shows solid-like self standing behavior. That means during formation of the hydrogel and the crosslinking process the hydrogel turns from fluid to a solid-like state, which is especially appropriate for many applications of the electrolyte hydrogel in various battery systems.

Especially preferably, the electrolyte hydrogel is for use in electrochemical cells comprising an electrolyte system with zinc salts.

Moreover, especially preferably, the electrolyte hydrogel is for use in electrochemical cells comprising at least one zinc electrode, wherein preferably the zinc electrode is the negative electrode and preferably comprises an active material which is particulate zinc or a particulate metallic zinc alloy, e.g. a zinc-manganese dioxide cell. More preferably, the electrochemical cell comprises an electrolyte system with zinc salts in combination with a zinc electrode.

Generally, the non-ionic polymer that may be used for the electrolyte hydrogel is composed of linear polymeric backbones covalently bonded to each other. This macrostructure can be made through different strategies depending on the desired properties. Most of the strategies can be applied to this system as long as the polymer is non-ionic and water soluble. The strategies can be divided in two main groups depending on the chemistry related with the synthesis of the tridimensional structure.

The first group is related to a free radical polymerization of a multifunctional polymer, which may also be a di- or multifunctional (macro)monomer or combinations thereof, to obtain a highly crosslinked network. Moreover, multifunctional moieties of the polymer may be mixed and/or partially replaced with monofunctional (macro)monomers. This strategy needs an initiator that starts the polymerization reaction through external stimuli (e.g. heat, radiation, plasma or a redox reaction). This strategy includes a series of variations that modify the network structure (mesh size) but are encompassed in the same synthetic process.

The second group deals with the crosslinking of a multifunctional moiety through addition reaction with a crosslinking agent. These reactions do not necessarily need an initiator but the mechanism needs chemical stimuli already present in the reaction media (e.g. pH). An external stimulus is not necessarily required, although heat may enhance the reaction. Similar to the above mentioned free radical polymerization several variations are possible through this synthetic process.

- Nature of the multifunctional moiety: This element should have more than three functional groups. Preferably it is a polymer with a functional side group in the repeating unit.
- Nature of the crosslinking agent: Preferably, it is a molecule and/or a low molecular weight polymer with at least two reactive groups.

The following non-limiting lists summarize some families of functional polymers (or macromonomers) depending on their reactive group. These polymers may be crosslinked by free radical polymerization:

Acrylate, Methacrylate, Acrylamides and Methacrylamides:

- Monofunctional: hydroxyethyl (meth)acrylate, dimethylaminoethyl (meth)acrylate, Hydroxypropyl (meth) acrylamide, N-isopropyl (meth)acrylamide, N,N-dimethyl (meth)acrylamide, polyethylene glycol methyl ether (meth)acrylate and polyethylene glycol methyl ether (meth)acrylamide;
- Bifunctional: N,N'-methylene bisacrylamide, Polyethylene glycol di(meth)acrylate, polyethylene glycol di(meth)acrylamide;
- Polyfunctional: (meth)acrylated polycarbohydrates (obtained through modification); 4, 6 and 8 arm polyethylene glycol (meth)acrylate.

Vinyls and allyls:

- Monofunctional: 4-vinyl pyridine, vinyl pyrrolidone, allyl amine, Polyethylene glycol methyl vinyl (allyl) ether;
- Bifunctional: polyethylene glycol divinyl (allyl) ether;
- Polyfunctional: vinyl(allyl) polycarbohydrates (modification needed).

Bifunctional or polyfunctional polymers may also be used as crosslinking agents.

The following initiators may be used:

- Thermal: 4,4'-Azobis(4-cyanovaleric acid) (V-501); 2,2'-Azobis[2-methyl-N-(2-hydroxyethyl)propionamide] (VA-086); 2,2'-Azobis[2-(2-imidazolin-2-yl)propane] dihydrochloride (VA-044); 2,2'-Azobis[2-(2-imidazolin-2-yl)propane] (VA-061); 2,2'-Azobis(2-methylpropionamidine)dihydrochloride (V-50); 2,2'-Azobis[N-(2-carboxyethyl)-2-methylpropionamidine] tetrahydrate (V-057); potassium persulfate (KPS);
- UV: 2-hydroxy-1-[4-(2-hydroxyethoxy) phenyl]-2-methyl-1-propanone (Irgacure 2959), 1-hydroxy-cyclohexyl-phenylketone (Irgacure 184), 2-Benzyl-2-dimethylamino-1-(4-morpholinophenyl)-1-butanone (Irgacure 369), 2-Methyl-4'(methylthio)-2-morpholinopropiophenone (Irgacure 907), 2,2-dimethoxy-2-phenylacetophenone (Irgacure 651), diphenyl(2,4,6-trimethylbenzoyl)phosphine oxide (TPO), Lithium phenyl-2,4,6-trimethylbenzoylphosphinate (LAP), VA-086;
- Redox: ammonium persulfate (APS), potassium persulfate (KPS), sodium persulfate (NaPS).

The following polymers may be crosslinked by addition reactions:

Multifunctional polymers

- Poly(Vinyl alcohol);
- Poly(allyl amine);
- Polcarbohydrates: Cellulose and its derivatives (hydroxyethyl cellulose, hydroxypropylmethyl cellulose), Dextrans, Glycosamino glycans, gums (Arabic, Guar), Chitosan, Amilose and aminopectin, Carrageenan, starch;
- Proteins: Gelatin.

The following crosslinking agents may be used:

- Vinyl sulfones: Divinyl sulfone and vinyl sulfone terminated PEG;
- Glycidyls: Epichlorohydrin and glycidyl terminated polyethylene glycol;
- Dialdehydes: Glutaraldehyde, malondihaldehyde, aldehyde terminated PEG;
- Anhydrides: 1,2,3,4-Butanetetracarboxylic dianhydride (BTCA), Succinic anhydride, Citric acid; Dithiols.

With regard to the non-ionic polymer the electrolyte hydrogel is preferably characterized by at least one of:

a. The non-ionic polymer is a polyethylene glycol (PEG) or a derivative thereof.

b. The non-ionic polymer is a diacrylate-polyethylene glycol (PEGDA).

PEG is built up from the monomer ethylene oxide. Preferably, the polyethylene glycol is a polyethylene glycol with low molecular weight. In this context, polyethylene glycols with a molecular weight of 300 to 1500 g/mol are particularly preferred.

PEGDA is a derivative of polyethylene glycol with crosslinkable functional groups (acrylate groups) that is able to form a hydrogel after crosslinking. In the process, PEGDA with a relatively low molecular weight is preferred, in particular PEGDA with a molecular weight of 300 to 1500 g/mol.

PEGDA can be described by the formula:

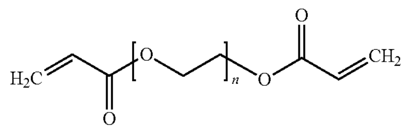

Depending on the size of n, the length of the monomer and thus the molecular weight differs. Preferably, PEGDA with n of 5 to 20 is used. n=15 is particularly preferred.

With regard to the cationic polymer within the electrolyte hydrogel, the electrolyte hydrogel is preferably characterized by at least one of:

a. The cationic polymer comprises a polymeric backbone and cationic functional groups.
b. The cationic polymer is a cellulose containing cationic functional groups.
c. The cationic functional groups are quaternary ammonium cations.
d. The cationic polymer is a hydroxyethyl cellulose ethoxylate containing quaternary ammonium cations.
e. The cationic polymer is a hydroxyethyl cellulose which is cationically substituted with trialkylammonium groups.

In principle, various cationic polymers are suitable for the preparation of an electrolyte hydrogel. Possible polymeric backbones for the cationic polymer are in particular polysaccharides (e.g. cellulose, chitosan, starch, rubber and the like), or polyvinyls, or polyallyls, or polyethers, or polyamines, or polyacrylates, or polyacrylamides, or polymethacrylates, or polymethacrylamides, or polyurethanes, or polycarbonates, or polyamides, or polyesters.

Possible cationic groups are, for example, tetrasubstituted ammonium with alkyl residues (methyl, ethyl and the like) or alkoxy residues, or pyridinium, or imidazolium, or triazolium, or pyrrolidinium, or piperidinium, or morpholinium, or guanidinium, or tetrasubstituted phosphonium with alkyl residues (methyl, ethyl and the like) or alkoxy residues. As counterions for the cationic group of the cationic polymer, halides such as Cl— or Br— or I—, or sulphonates or sulphates or methylsulphonates or triflates, or carboxylates with, for example, acetate residues, can be used.

In some instances, the functional groups are attached to the polymeric backbone via suitable spacers. Suitable spacers are, for example, alkyl spacers based on methyl, ethyl or alkyl groups with additional C-atoms. Further suitable spacers are ethylene oxide spacers, or thioether spacers, or ester spacers, or amide spacers.

Particularly preferably, the cationic polymer is cellulose containing cationic functional groups, in particular cellulose containing as cationic functional groups quaternary ammonium cations (quaternary cellulose). We achieved particularly good results with a hydroxyethyl cellulose which is cationically substituted with trialkylammonium groups, in particular trimethylammonium groups or triethylammonium groups. Surprisingly, a very homogeneous electrolyte hydrogel could be produced with such a cationic cellulose.

With respect to the electrolyte system and the salt, the electrolyte hydrogel is preferably characterized by at least one of:

a. The electrolyte hydrogel is based on a neutral electrolyte system.
b. The salt is a zinc salt.
c. The salt is a chloride.
d. The salt is $ZnCl_2$.

"Neutral electrolyte system" means that the pH value within the electrolyte hydrogel or within the composition from which the hydrogel is formed is at neutral pH (pH 7) or near neutral pH, e.g. pH 6.5 to pH 7.5.

The preferred salts of a neutral electrolyte systems are zinc salts. Mostly preferred is zinc chloride ($ZnCl_2$). We found in our experiments that zinc chloride is particularly advantageous with regard to the electrochemical properties of the resulting electrochemical cell.

Another example of a suitable chloride-based salt is ammonium chloride, which may also be preferred.

If the electrolyte hydrogel is based on a neutral electrolyte system, preferably, cationic cellulose is used as the cationic polymer, in addition to the crosslinking, non-ionic polymer.

The use of a neutral electrolyte system is particularly preferred. Particularly preferably, the salt of the neutral aqueous electrolyte is zinc chloride in accordance with the above-mentioned b. and c. since it has been shown that zinc chloride is particularly advantageous with regard to the electrochemical properties of the resulting cell.

Nevertheless, it is also possible to apply an alkaline electrolyte system to the electrolyte hydrogel. "Alkaline electrolyte system" means that the pH value within the electrolyte hydrogel or within the composition from which the hydrogel is formed is at above the neutral pH (pH 7), namely above pH 7.5.

Thus, it may also be preferred that the electrolyte hydrogel is characterized by at least one of:

a. The electrolyte hydrogel is based on an alkaline electrolyte system.
b. The salt is a metal hydroxide.
c. The metal hydroxide is KOH or NaOH or LiOH or $CaOH_2$, preferably KOH.

Mostly preferred is KOH as a salt in an alkaline electrolyte system.

All of the above-mentioned strategies of crosslinking allow the synthesis of a self standing electrolyte hydrogel. However, depending on the electrolyte system (neutral or alkaline) some restrictions may have to be made with respect to the crosslinkable, non-ionic polymer, especially depending of the pH of the aqueous solution.

Neutral: Most of the aqueous soluble polymers are compatible with this media, therefore there are no restrictions with the free radical polymerization mechanism (heat, UV, plasma, redox and the like). However, the addition reaction is not suitable due to the need either of a specific pH (acid or alkaline) or the presence of a catalyst.

Alkaline: In this example there are some possible examples with both reaction mechanism, free radical polymerization and addition reaction, that result in a hydrogel. However, the alkaline media restricts the materials available due to chemical stability and/or reaction mechanism.

Not all the materials and reaction mechanisms are suitable for both neutral and alkaline electrolyte systems. Table 1 shows the classification of the components listed above depending on the aqueous media.

TABLE 1

| | Neutral | Alkaline |
|---|---|---|
| Free radical polymerization | Acrylates, methacrylates, acrylamides and methacrylamides, Allyls and vinyls (No restrictions) | Allyl amine, PEG methyl vinyl(allyl) ether, polyethylene glycol divinyl (allyl) ether, vinyl(allyl) polycarbohydrates (modification needed) |
| Addition reactions | | Multifunctional polymers & Crosslinking agents |

The electrolyte hydrogel is based on a semi-interpenetrating polymer network. The network itself is formed by the crosslinked, non-ionic polymer, e.g. PEGDA. The cationic polymer, preferably cationic cellulose, is the interpenetrating component, which penetrates the network. This semi-interpenetrating polymer network forms the matrix for the ions of the electrolyte, in particular the zinc ions and the respective counter ions, which are the preferred electrolytically active species of the electrolyte hydrogel with respect to the electrochemical processes of the resulting electrochemical cell. A central aspect is that a polymer with cationic functional groups is used as the interpenetrating component. The use of a cationic polymer, preferably cationic cellulose, as interpenetrating component of a semi-interpenetrating polymer network is especially advantageous with zinc salts like zinc chloride or metal hydroxide compounds. In particular, the design of the electrolyte hydrogel does not lead to agglomerations or precipitations in the electrolyte hydrogel, therefore allowing high concentrations of the salt.

We found that the process of formation of a electrolyte hydrogel can be used to form a very advantageous, self-standing, soft and at the same time solid hydrogel, which on the one hand shows very good electrochemical properties for the energy storage functions of a resulting electrochemical cell and on the other hand has suitable mechanical properties that make it very suitable for e.g. the formation of a planar and thin electrochemical cell for a wide range of applications.

Furthermore, we provide a process for preparation of an electrolyte hydrogel as it is described above. The process is characterized by:

- a. a composition is provided, wherein the composition comprises
  - i. a crosslinkable, non-ionic polymer,
  - ii. a cationic polymer,
  - iii. an aqueous solvent and/or dispersant, and
  - iv. a salt which is solved in the aqueous solvent and/or dispersant;
- b. a layer of the composition is formed on a support; and
- c. the layer is treated such that crosslinking of the non-ionic polymer occurs and thereby the electrolyte hydrogel is formed based on a self standing polymer network.

Thus, according to our method, the electrolyte is obtained by treating the layer such that a crosslinking of the non-ionic polymer occurs, wherein the crosslinking leads to the formation of the hydrogel. The layer with the crosslinked polymer is especially suitable and useful as the ion-conductive electrolyte of an electrochemical cell.

With respect to further details of components of the composition, namely with respect to the crosslinkable, non-ionic polymer, the cationic polymer, the solvent and/or dispersant, and the salt, it is referred to the above description.

Application of the layer to the support can be accomplished by different methods, for example, by a coating step with the help of a doctor blade or by spraying the composition onto the support. Especially preferably, application of the layer to the support is done by a printing process. Generally, with a printing process, flat areas or very narrow and defined areas can be coated in a very practical manner. It is thus preferred that application of the layer to the support is accomplished by a printing process, preferably by a screen printing process.

Preferably, the layer is prepared on the support with a thickness of less than 1 mm, in particular with a thickness of 1 μm to 750 μm, preferably 50 μm to 600 μm, more preferably 100 μm to 450 μm.

Particularly preferably, a wetting break is carried out after deposition of the composition for the gel electrolyte to the support and before the crosslinking. This applies in particular when the support is the at least one negative electrode and/or at least one positive electrode of an electrochemical cell. During the wetting break, the freshly applied composition for the electrolyte hydrogel can sufficiently wet and penetrate the support. A period of several minutes, for example, 1 min to 10 min, preferably 5 min, can be provided for this purpose.

After deposition of the composition to the support and, if applicable, after the wetting break, the treatment to form the crosslinking within the composition is carried out by crosslinking the non-ionic polymer.

With regard to the concentration of the crosslinkable, non-ionic polymer within the composition, the process is particularly preferably characterized by:

- a. The concentration of the non-ionic polymer, in particular of the polyethylene glycol, in the composition is 1% to 25% by weight, preferably 5% to 15% by weight, more preferably 10% by weight.

With regard to the concentration of the cationic polymer within the composition, the process is preferably characterized by:

- a. The concentration of the cationic polymer, preferably cationic cellulose, in the composition is 0.1% to 10% by weight, preferably 1% to 7% by weight, more preferably 3% to 4% by weight.

We achieved particularly good results in the formation of the electrolyte hydrogel with a composition containing 10% by weight of PEGDA and 3% by weight of cationic cellulose.

With regard to the concentration of the salt, depending from the type of salt, the process is preferably characterized by one of:

- a. The salt is a zinc salt, preferably $ZnCl_2$, and the concentration of the salt in the aqueous solvent and/or dispersant is 0.1 M to 2.5 M, preferably 0.5 M to 1.5 M, more preferably 1 M; or
- b. the salt is a metal hydroxide, preferably KOH or NaOH or LiOH or $CaOH_2$, and the concentration of the metal hydroxide in the aqueous solvent and/or dispersant is 0.1 M to 10 M, preferably 0.5 M to 7 M, more preferably 4 M to 6 M, most preferably 4 M.

We achieved particularly good results with a composition for the electrolyte hydrogel containing 1 M zinc chloride ($ZnCl_2$) in combination with 10% by weight PEGDA and 3% by weight cationic cellulose.

Particularly preferably, the method is characterized by at least one of:

- a. The crosslinking of the non-ionic polymer is carried out by a heat treatment and/or a redox treatment and/or a plasma treatment and/or a chemical treatment, in particular by a pH treatment;
- b. The crosslinking is carried out by a radiation treatment, in particular a UV treatment.

Crosslinking of the non-ionic polymer and thus formation of the electrolyte hydrogel can take place in different ways. For example, the heat treatment and/or a redox treatment and/or a plasma treatment and/or a chemical treatment, for example, a pH treatment, can be carried out for this purpose, whereby these treatments are preferably carried out after deposition of the composition for the electrolyte hydrogel on the support respectively the application of the composition to the support.

Particularly preferably, the crosslinking is carried out by the radiation treatment, in particular of the UV treatment.

Generally, the crosslinking takes places only within and between the molecules of the non-ionic polymer fraction and there are no crosslinking interactions between the cationic and the non-ionic polymers.

In a radiation treatment and in particular a UV treatment, the method is preferably characterized by at least one of:

a. The composition comprises a photoinitiator and the crosslinking is carried out by a UV treatment;
b. The photoinitiator is a water-soluble photoinitiator;
c. The photoinitiator is 2-hydroxy-4'-(2-hydroxyethoxy)-2-methylpropiophenone.

Especially preferably, the composition for the electrolyte hydrogel comprises a photoinitiator, wherein preferably the crosslinking is carried out by UV treatment. This preferred example has the particular advantage that the crosslinking takes place very quickly, which minimizes drying of the electrolyte after deposition of the composition on the support and before crosslinking is completed.

The photoinitiator 2-hydroxy-4'-(2-hydroxyethoxy)-2-methylpropiophenone is available under the trade name Irgacure®. Especially Irgacure® D-2959 has led to very good results in our experiments. Nevertheless, other crosslinking agents and in particular other photoinitiators may be used, preferably water-soluble photoinitiators.

With respect to preferred concentrations of the photoinitiator, the process is preferably characterized by:

d. the concentration of the photoinitiator in the composition is 0.01% to 1% by weight, preferably 0.05% to 0.15% by weight, more preferably 0.1% by weight.

We achieved particularly good results with regard to formation of the electrolyte hydrogel with a composition in which the concentration of the photoinitiator was 0.1% by weight in combination with 1 M zinc chloride, 10% by weight PEGDA and 3% by weight cationic cellulose.

In other examples, the composition for formation of the electrolyte hydrogel does not comprise a photoinitiator but a different initiator (e.g. in combination with heat or redox stimuli) or a crosslinking agent (e.g. in combination with pH stimuli), depending on the curing system.

We achieved good results with regard to formation of the electrolyte hydrogel through thermal polymerization respectively crosslinking with a composition in which the concentration of a thermal initiator, in particular 2,2'-Azobis(2-methylpropionamidine) dihydrochloride, was 0.1% by weight in combination with 1 M zinc chloride, 10% by weight PEGDA and 3% by weight cationic cellulose. Thermal treatment may be carried out at 50 to 80° C., e.g. 65° C., for about 10 to 30 min, e.g. 15 min, in e.g. an oven.

If a crosslinking agent is comprised in the composition, the concentration of the crosslinking agent is preferably 0.1% to 10% by weight, more preferably 1% to 5% by weight, even more preferably 2% to 4% by weight. Depending on the nature of the crosslinking agent in some examples a concentration of 1% by weight of the crosslinker, like e.g. N,N-methylene bisacrylamide in combination with acrylamide (non-ionic polymer) may be preferred.

We achieved good results with regard to formation of the electrolyte hydrogel with an alkaline electrolyte system through pH mediated polymerization respectively crosslinking with a composition in which the concentration of a crosslinker, in particular epichlorohydrin, was 2% by weight in combination with 4 KOH, 2% by weight cellulose derivative (non-ionic polymer), in particular hydroxyethyl cellulose, and 3% by weight cationic cellulose. Crosslinking in the alkaline medium may be finished within about 10 to 45 min, e.g. within 30 min.

Moreover, we achieved good results with regard to formation of the electrolyte hydrogel with an alkaline electrolyte system through thermal polymerization respectively crosslinking with a composition in which the concentration of a thermal initiator, in particular potassium persulfate, was 0.1% by weight and the concentration of a crosslinker, in particular N,N-methylene bisacrylamide, was 1% by weight in combination with 4 KOH, 10% by weight acrylamide (non-ionic polymer), and 3% by weight cationic cellulose. Thermal treatment may be carried out at 50 to 80° C., e.g. 65° C., for about 10 to 30 min, e.g. 15 min, in e.g. an oven.

Further exemplary initiators and crosslinking agents are already described above.

The electrolyte hydrogel is preferably obtainable by the process as described above.

Preferably, in the electrolyte hydrogel the concentration of the non-ionic polymer, in particular of the polyethylene glycol, within the electrolyte hydrogel is 1% to 25% by weight, preferably 5% to 15% by weight, more preferably 10% by weight.

Preferably, the concentration of the cationic polymer, preferably cationic cellulose, within the electrolyte hydrogel is 0.1% to 10% by weight, preferably 1% to 7% by weight, more preferably 3% to 4% by weight.

Especially preferably, the electrolyte hydrogel contains 10% by weight of PEGDA and 3% by weight of cationic cellulose.

If the salt is a zinc salt, preferably $ZnCl_2$, preferably, the concentration of the salt within the electrolyte hydrogel is 0.1 M to 2.5 M, preferably 0.5 M to 1.5 M, more preferably 1 M.

We achieved particularly good results with a electrolyte hydrogel containing 1 M zinc chloride ($ZnCl_2$) in combination with 10% by weight PEGDA and 3% by weight cationic cellulose.

Preferably, if the salt is a hydroxide salt, preferably KOH or NaOH or LiOH or $CaOH_2$, the concentration of the salt within the electrolyte hydrogel is 0.1 M to 10 M, preferably 0.5 M to 7 M, more preferably 4 M to 6 M.

We further provide an electrochemical cell with the following:

a. the electrochemical cell comprises at least one negative electrode and at least one positive electrode; and
b. the cell comprises an ion-conductive electrolyte which is an electrolyte hydrogel as described above.

According to b., the electrolyte hydrogel is based on a self standing polymer network with a crosslinked, non-ionic polymer and a cationic polymer and a salt, preferably a zinc salt or a hydroxide salt. Especially preferred are zinc salts like $ZnCl_2$ or hydroxide salts like KOH or NaOH or LiOH or $CaOH_2$. More preferably, the electrolyte hydrogel is based on a self standing polymer network with a crosslinked polyethylene glycol diacrylate and quaternary cellulose and a zinc salt or a hydroxy salt.

Preferably, the electrolyte hydrogel of the electrochemical cell is prepared as described above.

Preferably, the electrodes of the electrochemical cell are arranged on an electrically non-conductive support.

Preferably, the electrochemical cell is a cell with electrodes in a coplanar arrangement, wherein the electrolyte hydrogel forms a layer that covers the electrodes. Preferably, the electrochemical cell comprises the electrodes in a stacked arrangement, wherein the electrolyte hydrogel forms one or more layers which separates electrodes of opposite polarity in the stack.

An advantage of the stacked arrangement of the electrodes is that the electrochemical cell can supply stronger currents.

So, particularly preferably, the electrochemical cell is characterized by at least one of a. to e.:

a. the cell comprises the at least one negative electrode and the at least one positive electrode in a co-planar arrangement on an electrically non-conductive support;
b. the cell comprises the at least one negative electrode and the at least one positive electrode in a stacked arrangement, wherein the electrolyte hydrogel forms one or more layers which separates electrodes of opposite polarity in the stack;
c. the at least one negative electrode and/or the at least one positive electrode are electrodes which are formed by a printing process;
d. the cell comprises a first electrical conductor for contacting the at least one negative electrode and a second electrical conductor for contacting the at least one positive electrode;
e. the cell comprises a housing which encloses the electrodes and the electrolyte hydrogel.

When the negative electrode and the positive electrode are arranged co-planar on the support, the distance between the electrodes can be, for example, 1 μm to 10 mm. A distance of 100 μm to 1 mm is particularly preferred. The ionic conductivity between the electrodes during the electrochemical processes is achieved by the electrolyte hydrogel, which preferably covers the electrodes at least partially and more preferably completely. It may also be provided that the electrolyte hydrogel protrudes over the surfaces of the electrodes. With a co-planar arrangement of the electrodes a particularly flat design of the electrochemical cell is possible.

When the electrochemical cell with the negative electrode and the positive electrode is in a stacked arrangement according to the aforementioned b., it may be preferred that an additional separator is located between the electrodes. Preferably, this separator contains pores or voids in which the hydrogel can protrude. Alternatively, it is possible to add electrically non-conducive particles or fibers, for example, of a ceramic nature to the composition for the preparation of the hydrogel. These particles and/or fibers can confer mechanical resistance and strength to layers of the hydrogel.

According to the above-mentioned d., the electrochemical cell preferably comprises electrical conductors for contacting the electrodes. These can be electrically conductive foils, for example, metal foils, or metal layers applied by metallization on an electrically non-conductive support. In other examples, the electrical conductors can also be applied in a printing process by using printable pastes containing, for example, silver particles. A foil, preferably a plastic foil, is particularly suitable as a support.

The housing according to the aforementioned e. preferably comprises a film or even consists of a film, for example, a plastic film or a multilayer plastic-metal-composite film.

Preferably, the electrochemical cell is characterized by at least one of:

a. the at least one negative electrode is formed as a layer and comprises an active material which is particulate metallic zinc or a particulate metallic zinc alloy, and preferably further comprises an elastic binder or an elastic binder mixture;
b. the at least one positive electrode is formed as a layer and comprises an active material which is a particulate metal oxide, preferably manganese dioxide, and preferably further comprises an elastic binder or an elastic binder mixture and/or at least one additive to improve electrical conductivity of the at least one positive electrode;
c. the electrochemical cell is a zinc-manganese dioxide cell.

Preferably, the above a. to c. are realized in combination.

Preferably, the electrolyte hydrogel of the electrochemical cell with electrodes according to the aforementioned a. and b. contains dissolved zinc chloride or ammonium chloride or a metal hydroxide like KOH.

Suitable binders or binder mixtures for electrodes are known to a skilled person. The negative electrode may comprise, for example, as the binder or binder mixture at least one member of the group comprising cellulose and its derivatives, in particular carboxymethylcellulose (CMC), polyacrylates (PA), polyacrylic acid (PAA), polychlorotrifluoroethylene (PCTFE), polyhexafluoropropylene (PHFP), polyimides (PI), polytetrafluoroethylene (PTFE), poly-trifluoroethylene (PTrFE), polyvinyl alcohol (PVA), polyvinylidene difluoride (PVDF), styrene-butadiene rubber (SBR), and mixtures of the above materials.

The positive electrode may comprise, for example, as a the elastic binder or binder mixture at least one member from the group comprising cellulose and its derivatives, in particular carboxymethyl cellulose (CMC), polyacrylates (PA), polyacrylic acid (PAA), polychlorotrifluoroethylene (PCTFE), polyhexafluoropropylene (PHFP), polyimides (PI), polytetrafluoroethylene (PTFE), polytrifluoroethylene (PTrFE), polyvinyl alcohol (PVA), polyvinylidene difluoride (PVDF), styrene-butadiene rubber (SBR), and mixtures of the above materials.

For example, a combination of a cellulose derivative and SBR can be used as a binder mixture for the cathode and/or for the anode. For example, the anode and the cathode may contain 0.5 wt. % to 5 wt. % carboxymethyl cellulose and/or 0.5 wt. % to 10 wt. % SBR.

Additives to improve electrical conductivity of the at least one positive electrode may include activated carbon, activated carbon fiber, carbide-derived carbon, carbon aerogel, graphite, graphene and carbon nanotubes (CNTs).

The zinc-manganese oxide cell, which is realized in a particularly preferred example of the electrochemical cell, is particularly advantageous. It allows the production of low-cost cells, which are also very advantageous for safety reasons and also with regard to environmental aspects.

Our electrochemical cells are suitable for a wide variety of applications including different types of battery systems, for example, for the energy supply of sensor systems in a wide variety of consumer goods.

Our electrochemical cells are not restricted to a specific type of battery or energy storage system. Especially preferred, the cell is a printed electrochemical cell. That is to say, that at least one functional part of the cell, for example, one of the electrodes or the electrolyte hydrogel which forms the ion-conductive electrolyte, is formed by a printing process. Nevertheless, the electrolyte hydrogel can be also applied in connection with other cells like cylindrical cells or button cells or prismatic cells or batteries. In this context, "battery" is meant to comprise a plurality of electrochemical cells which are the smallest units of energy storage elements. In a battery, two or more electrochemical cells are electrically connected to each other.

Finally, we provide a process for the manufacturing of an electrochemical cell. The process refers to the manufacturing of an electrochemical cell with at least one negative electrode and at least one positive electrode and an ion-conductive electrolyte. The key aspect of the process is the preparation of the hydrogel electrolyte which is prepared according to the process as described above and which provides the ion-conductive electrolyte of the cell.

The process for the manufacturing of an electrochemical cell is especially useful for the preparation of a planar and thin and, depending on the type of support used, also flexible electrochemical cells. Nevertheless, also other types of electrochemical cells like cylindrical or prismatic cells or batteries can be provided. In general, the electrochemical cells or batteries obtainable by the method are characterized by very good energy storage properties. At the same time the electrochemical cells or batteries have excellent mechanical properties due to the design of the electrolyte hydrogel, which makes the cells or batteries suitable for a variety of applications.

Furthermore, the process for the manufacturing of an electrochemical cell is accessible to automation in a particularly advantageous way so that this process is particularly suitable for particularly cost-effective mass production of electrochemical cells.

Preferably, the electrochemical cell is manufactured at least partly by a printing process. It is especially preferred that the process comprises formation of the positive and/or negative electrode by a printing process. It is state of the art to produce electrodes on the basis of printable pastes or inks containing the corresponding active materials for the respective electrodes. For example, pastes and inks for the production of zinc electrodes or manganese oxide electrodes are commercially available for the well-known Leclanche systems or alkaline systems. The printing may be performed by a screen printing process. It may be preferred that both the electrodes and the hydrogel electrolyte are applied by printing processes to the support.

Preferably, the support of the electrochemical cell is an electrically non-conductive support.

The composition for formation of the electrolyte hydrogel may be directly applied to the support, next the crosslinking may be accomplished and then the crosslinked layer may be arranged between the electrodes of the cell to be manufactured. However, preferably, formation of the electrolyte is accomplished in direct contact with at least one of the electrodes. In these examples, it is preferred to deposit the layer of the composition directly onto the at least one negative electrode and/or the at least one positive electrode, followed directly by the crosslinking.

Preferably, an electrically non-conductive support is provided on which the at least one negative electrode and/or the at least one positive electrode are arranged, for example, in a coplanar arrangement. Then, the electrolyte layer is formed on the electrodes.

Particularly preferably, a wetting break is carried out after deposition of the composition for the gel electrolyte to the support and before the crosslinking. This applies in particular when the support is the at least one negative electrode and/or at least one positive electrode. During the wetting break the freshly applied composition for the electrolyte hydrogel can sufficiently wet and penetrate the support. A period of several minutes, for example, 1 min to 10 min, preferably 5 min, can be provided for this purpose.

After deposition of the composition to the support and, if applicable, after the wetting break, the treatment to form the crosslinking within the composition is carried out by the crosslinking of the non-ionic polymer.

The process allows a particularly cost-effective and at the same time environmentally friendly and resource-saving manufacturing of electrochemical cells. At the same time, the process is easy to carry out and can easily be implemented on an industrial scale.

For example, the electrodes can be printed in a continuous process on the support, for example, on a plastic foil, in a known manner, e.g. as co-planar electrodes. Preferably, the support is equipped with electrical conductors on which the electrodes are printed. Afterwards, the electrodes can be coated with the composition for the electrolyte hydrogel, for example, in a printing process or by using a doctor blade. Subsequently, the crosslinking can be carried out, for example, by UV light. To produce a cell with electrodes in a stacked arrangement, it is possible to fold the support with the electrodes in the coplanar arrangement.

Further features and advantages read from the following description of preferred examples in connection with the drawings. The individual features can be realized separately or in combination with each other.

EXAMPLES

Example I—Neutral Hydrogel Formation Process Through UV Polymerization

FIG. 1 schematically shows the structure of a cell 10 having a strip-shaped printed anode 11, in particular a zinc anode, and a strip-shaped printed cathode 12, in particular a carbon-manganese dioxide cathode. The electrodes 11 and 12 are printed on the flat, electrically non-conductive support 13, for example, a plastic film. Above the electrodes 11 and 12 there is a flat electrolyte hydrogel 14, wherein the electrolyte hydrogel 14 is located both on the area of the electrodes 11 and 12 and in an area projecting slightly further beyond them. Furthermore, electrical conductors 15 and 16 are provided which make electrical contact with anode 11 and cathode 12, respectively, and thus conduct the negative pole and the positive pole to the outside so that an electrical consumer can be connected here.

In further examples of such a cell 10, a housing may be provided if necessary. For example, a further plastic film (not shown here) may be provided, which forms, together with the support 13, an enclosure which protects both the electrodes and the electrolyte hydrogel.

Figures 2A, 2B, 2C:
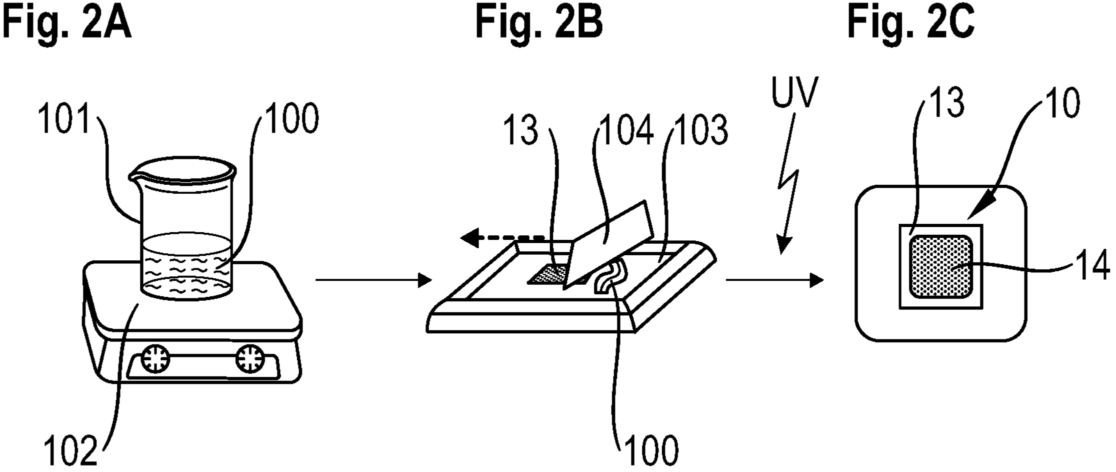
FIGS. 2A-2C illustrate process steps for the preparation of the electrolyte hydrogel.

FIGS. 2A-2C illustrate the individual process steps for the preparation of an electrolyte hydrogel. First, a composition 100 for the preparation of the electrolyte hydrogel was prepared and mixed (step A). The composition of this initial solution (EPS) in a preferred example was as follows, wherein water was used as solvent:

| | |
|---|---|
| Cationic cellulose | 3 wt. % |
| PEGDA | 10 wt. % |
| Photoinitiator (Irgacure ®) | 0.1 wt. % |
| $ZnCl_2$ | 1M |

The cationic cellulose used was quaternary hydroxyethyl cellulose ethoxylate (trade name Polyquaternium-10, Sigma-Aldrich, US). The PEGDA used was 700 g/mol molecular weight (Sigma-Aldrich, US) with n=15. The photoinitiator used was 2-hydroxy-4'-(2-hydroxyethoxy)-2-methylpropiophenone (Sigma-Aldrich, US). The components were brought together in an aqueous solution to form composition 100 and stirred in a beaker 101 on a magnetic mixer 102 until homogeneity was achieved.

The next step was the coating process (step B). An anode 11 was provided as a support 13 on a flat carrier 103. Composition 100 was evenly distributed on the electrode 11 by a squeegee 104.

A coating speed of 50 mm/min was set for this purpose. The coating thicknesses achieved were 150 to 750 μm. The coated anode 11 was left to stand for 5 minutes to allow sufficient wetting and penetration with composition 100 (wetting break). Afterwards, a UV treatment was carried out for 5 min at 35-40 W/cm2 (size of the anode 11: 14-16 cm2). A BSM-03 irradiation chamber (UV-Messtechnik Opsytec Dr. Gröbel GmbH, DE) was used for irradiation. Within a short time the crosslinking in the forming electrolyte hydrogel was completed (step C). The hydrogel 14 appeared as a semi-transparent layer on the anode 11. To prepare a cell, it is, for example, possible to print a cathode in a further step onto the hydrogel layer 14.

Figure 3A:
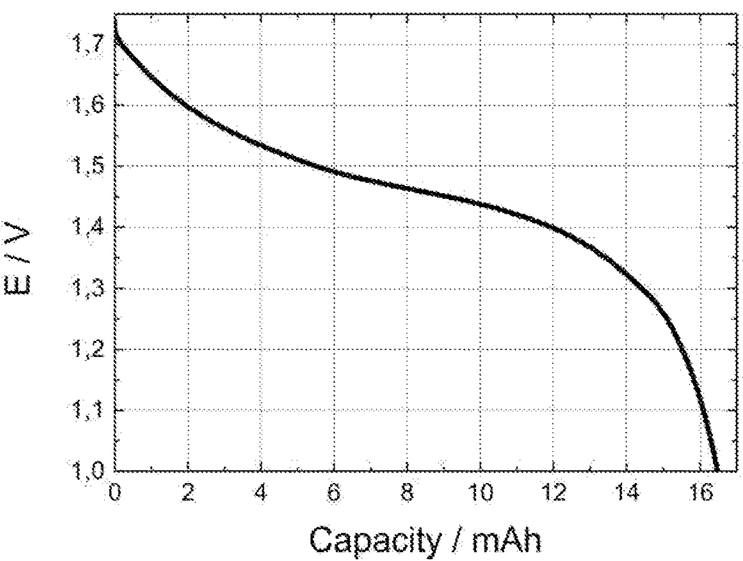
FIGS. 3A-3C are diagrams illustrating the electrochemical characterization of a cell.
Figure 3B:
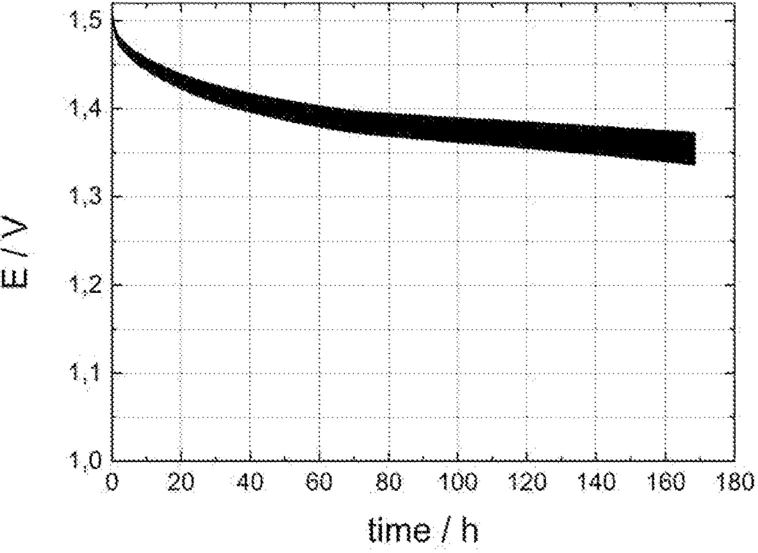
Figure 3C:
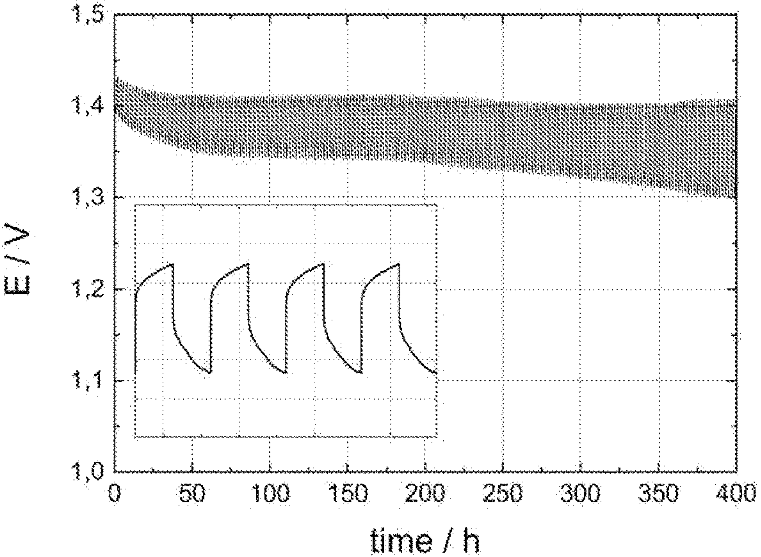

Cells 10 produced in this way were further investigated with regard to their electrochemical properties. In particular, the cells were characterized by: (i) discharge under constant current conditions (50 μA), (ii) discharge under pulse current discharge conditions (100 μW during 6 s follow by a rest period at open circuit voltage of 30 s), (iii) capacity evolution under charge/discharge cycling conditions (50 μW during 1 hour for every charge or discharge in each cycle). FIG. 3A shows that the system is able to provide a capacity of 16 mAh when it is discharged under constant current conditions (Volt versus the capacity in mAh). FIG. 3B shows that the system is able to provide 16,800 cycles under pulse current conditions, which represent an overall capacity of ~2 mAh (Volt versus time in h). FIG. 3C illustrates the charge/discharge profiles of the system at different cycles with reversibility up to 600 hours (Volt versus time in h). Overall, the measurement data proved very good electrochemical properties of the cells that can be manufactured with the electrolyte hydrogel.

Example II—Neutral Hydrogel Formation Process Through Thermal Polymerization

For formation of a neutral electrolyte hydrogel through thermal polymerization the same compounds for the initial solution (EPS) were used as in Example I except for the photoinitiator which was replaced by a thermal initiator. Thus, the initial solution was as follows, wherein water was used as solvent:

| | |
|---|---|
| Cationic cellulose | 3 wt. % |
| PEGDA | 10 wt. % |
| Thermal initiator | 0.1 wt. % |
| $ZnCl_2$ | 1M |

The thermal initiator used was 2,2'-Azobis(2-methylpropionamidine) dihydrochloride (Sigma-Aldrich, US).

After mixing and coating like in Example I the coated anode was left to stand for 5 minutes to allow sufficient wetting and penetration with the composition (wetting break). Afterwards, a thermal treatment was carried out at 65° C. for 15 min in an oven. Within a short time the crosslinking in the forming electrolyte hydrogel was completed. Also, in this example, the hydrogel appeared as a semi-transparent layer on the anode. To prepare a cell, it is, for example, possible to print a cathode in a further step onto the hydrogel layer.

Example III—Alkaline Hydrogel Formation Process Through pH Mediated Crosslinking For formation of an electrolyte hydrogel based on an alkaline electrolyte system through pH mediated crosslinking the following compounds for the initial solution (EPS) were used, wherein water was used as solvent:

| | |
|---|---|
| Cationic cellulose | 3 wt. % |
| Cellulose derivative | 2 wt. % |
| Crosslinker | 2 wt. % |
| KOH | 4M |

The cationic cellulose used was quaternary hydroxyethyl cellulose ethoxylate (trade name Polyquaternium-10, Sigma-Aldrich, US). The cellulose derivative was hydroxyethyl cellulose used (trade name Natrosol, Ashland, US). The crosslinker was epichlorohydrin (abcr GmbH, DE). The cationic cellulose and cellulose derivative were brought together in an aqueous solution to form the composition and stirred in a beaker on a magnetic mixer until homogeneity was achieved. Afterwards the crosslinker was added and stirred over 2 minutes until homogeneity was achieved.

After coating like in Example I the coated anode was left to stand for 30 minutes to allow sufficient wetting and penetration with the composition (wetting break) as well as to let the solution to crosslink by alkaline media. Within a time of 30 minutes the crosslinking in the forming electrolyte hydrogel was completed. The hydrogel appeared as a semi-transparent layer on the anode. To prepare a cell, it is, for example, possible to print a cathode in a further step onto the hydrogel layer.

Example IV—Alkaline Hydrogel Formation Process Through Thermal Polymerization For formation of an electrolyte hydrogel based on an alkaline electrolyte system through thermal polymerization respectively crosslinking the following compounds for the initial solution (EPS) were used, wherein water was used as solvent:

| | |
|---|---|
| Cationic cellulose | 3 wt. % |
| Acrylamide | 10 wt %. |
| Crosslinker | 1 wt % |
| Thermal initiator | 0.1 wt % |
| KOH | 4M |

The cationic cellulose used was quaternary hydroxyethyl cellulose ethoxylate (trade name Polyquaternium-10, Sigma-Aldrich, US). Acrylamide (Sigma-Aldrich, US) and the crosslinker was N,N-methylene bisacrylamide (Sigma-Aldrich, US). The thermal initiator was potassium persulfate (KPS, Sigma-Aldrich, US). The cationic cellulose, Acrylamide, crosslinker and the initiator were brought together in an aqueous solution to form the composition and stirred in a beaker on a magnetic mixer until homogeneity was achieved.

After coating like in Example I the coated anode was left to stand for 5 minutes to allow sufficient wetting and penetration with the composition (wetting break). Afterwards, a thermal treatment was carried out at 65° C. for 15 min in an oven. Within a short time the crosslinking in the forming electrolyte hydrogel was completed. The hydrogel appeared as a semi-transparent layer on the anode. To prepare a cell, it is, for example, possible to print a cathode in a further step onto the hydrogel layer.

All examples (Examples I-IV) can be easily implemented in other coplanar or stacked battery configurations as well as in standard coin, cylindrical, pouch or prismatic energy storage cells and batteries.

The invention claimed is:

1. An electrolyte hydrogel for an electrochemical cell comprising a self standing polymer network with a cross-linked, non-ionic polymer and a cationic polymer and a salt in an aqueous solvent and/or dispersant.

2. The electrolyte hydrogel of claim 1, wherein at least one of:

a. the non-ionic polymer is a polyethylene glycol (PEG) or a derivative thereof; and b. the non-ionic polymer is a diacrylate-polyethylene glycol (PEGDA).

3. The electrolyte hydrogel of claim 1, wherein at least one of:

a. the cationic polymer comprises a polymeric backbone and cationic functional groups;

b. the cationic polymer is a cellulose containing cationic functional groups;

c. the cationic functional groups are quaternary ammonium cations;

d. the cationic polymer is a hydroxyethyl cellulose ethoxylate containing quaternary ammonium cations; and e. the cationic polymer is a hydroxyethyl cellulose which is cationically substituted with trialkylammonium groups.

4. The electrolyte hydrogel of claim 1, wherein at least one of:

a. the electrolyte hydrogel is based on a neutral electrolyte system;

b. the salt is a zinc salt;

c. the salt is a chloride; and d. the salt is $ZnCl_2$.

5. The electrolyte hydrogel of claim 1, wherein at least one of:

a. the electrolyte hydrogel is based on an alkaline electrolyte system;

b. the salt is a metal hydroxide; and c. the metal hydroxide is KOH or NaOH or LiOH or $CaOH_2$.

6. A method of preparing an electrolyte hydrogel comprising:

a. providing a composition, wherein the composition comprises i. a crosslinkable, non-ionic polymer, ii. a cationic polymer, iii. an aqueous solvent and/or dispersant, and iv. a salt which is solved in at least one of aqueous solvent and dispersant;

b. forming a layer of the composition on a support; and c. treating the layer such that crosslinking of the non-ionic polymer occurs and thereby the electrolyte hydrogel is formed based on a self standing polymer network.

7. The method of claim 6, wherein the concentration of the non-ionic polymer in the composition is 1% to 25% by weight.

8. The method of claim 6, wherein the concentration of the cationic polymer in the composition is 0.1% to 10% by weight.

9. The method of claim 6, wherein one of:

a. the salt is a zinc salt, and the concentration of the salt in the aqueous solvent and/or dispersant is 0.1 M to 2.5 M; or b. the salt is a metal hydroxide, and the concentration of the metal hydroxide in the aqueous solvent and/or dispersant is 0.1 M to 10 M.

10. The method of claim 6, wherein at least one of:

a. the crosslinking of the non-ionic polymer is carried out by a heat treatment and/or a redox treatment and/or a plasma treatment and/or a chemical treatment and/or a pH treatment; and b. the crosslinking is carried out by a UV treatment.

11. The method of claim 6, wherein at least one of:

a. the composition comprises a photoinitiator and the crosslinking is carried out by a UV treatment;

b. the photoinitiator is a water-soluble photoinitiator;

c. the photoinitiator is 2-hydroxy-4'-(2-hydroxyethoxy)-2-methylpropiophenone; and d. the concentration of the photoinitiator in the composition is 0.01% to 1% by weight.

12. An electrochemical cell comprising:

a. the electrochemical cell comprises at least one negative electrode and at least one positive electrode; and b. the electrochemical cell comprises an ion-conductive electrolyte which is the electrolyte hydrogel according to claim 1.

13. The electrochemical cell of claim 12, wherein at least one of:

a. the electrochemical cell comprises the at least one negative electrode and the at least one positive electrode in a co-planar arrangement on an electrically non-conductive support;

b. the electrochemical cell comprises the at least one negative electrode and the at least one positive electrode in a stacked arrangement, and the electrolyte hydrogel forms one or more layers which separates electrodes of opposite polarity within the stack;

c. the at least one negative electrode and/or the at least one positive electrode are printed electrodes;

d. the electrochemical cell comprises a first electrical conductor to contact the at least one negative electrode and a second electrical conductor to contact the at least one positive electrode; and e. the cell comprises a housing that encloses the electrodes and the electrolyte hydrogel.

14. The electrochemical cell of claim 12, wherein at least one of:

a. the at least one negative electrode is formed as a layer and comprises an active material which is particulate metallic zinc or a particulate metallic zinc alloy, and further comprises an elastic binder or an elastic binder mixture;

b. the at least one positive electrode is formed as a layer and comprises an active material which is a particulate metal oxide, manganese dioxide, and further comprises an elastic binder or an elastic binder mixture and/or at least one additive to improve electrical conductivity of the at least one positive electrode; and c. the electrochemical cell is a zinc-manganese dioxide cell.

15. A method of manufacturing the electrochemical cell according to claim 12 with at least one negative electrode and at least one positive electrode and an ion-conductive electrolyte which is an electrolyte hydrogel for an electrochemical cell comprising a self standing polymer network with a crosslinked, non-ionic polymer and a cationic polymer and a salt in an aqueous solvent and/or dispersant, wherein to prepare the hydrogel electrolyte a method of preparing an electrolyte hydrogel, comprising:

a. providing a composition, wherein the composition comprises i. a crosslinkable, non-ionic polymer, ii. a cationic polymer, iii. an aqueous solvent and/or dispersant, and iv. a salt which is solved in at least one of aqueous solvent and dispersant;

b. forming a layer of the composition on a support; and c. treating the layer such that crosslinking of the non-ionic polymer occurs and thereby the electrolyte hydrogel is formed based on a self standing polymer network;

is carried out.

* * * * *